US010047632B2

(12) United States Patent
Lighty et al.

(10) Patent No.: US 10,047,632 B2
(45) Date of Patent: Aug. 14, 2018

(54) RADIALLY STACKED INTERSHAFT BEARING

(71) Applicants: Rolls-Royce North American Technologies, Inc., Indianapolis, IN (US); Rolls-Royce Corporation, Indianapolis, IN (US)

(72) Inventors: Kerry J. Lighty, Avon, IN (US); Jared I. Taketa, Indianapolis, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 284 days.

(21) Appl. No.: 14/948,821

(22) Filed: Nov. 23, 2015

(65) Prior Publication Data

US 2016/0146046 A1 May 26, 2016

Related U.S. Application Data

(60) Provisional application No. 62/083,503, filed on Nov. 24, 2014.

(51) Int. Cl.
*F01D 25/16* (2006.01)
*F16C 19/55* (2006.01)
(Continued)

(52) U.S. Cl.
CPC ............ *F01D 25/16* (2013.01); *F01D 5/026* (2013.01); *F01D 25/162* (2013.01); *F01D 25/18* (2013.01);
(Continued)

(58) Field of Classification Search
CPC ........ F01D 25/16; F01D 25/162; F01D 25/18; F02C 7/06; F02C 7/36; F05D 2260/98; F05D 2220/32; F16C 19/26
See application file for complete search history.

(56) References Cited

U.S. PATENT DOCUMENTS 3,491,536 A * 1/1970 Hadaway ................ F01D 25/16
415/175
3,531,167 A * 9/1970 Cyril ....................... F01D 25/18
384/475
(Continued)

FOREIGN PATENT DOCUMENTS

| EP | 1939430 A2 | 7/2008 |
| EP | 2119877 A2 | 11/2009 |
| FR | 2977636 A1 | 1/2013 |

OTHER PUBLICATIONS

European Search Report for European Application No. EP15195944 dated Apr. 1, 2016.
English Abstract for FR2977636A1.

*Primary Examiner* — Woody Lee, Jr.
*Assistant Examiner* — Elton Wong
(74) *Attorney, Agent, or Firm* — Fishman Stewart PLLC

(57) ABSTRACT

An exemplary gas turbine engine includes a radially stacked intershaft bearing assembly. The assembly includes an outer stubshaft having outer and inner diameter surface portions disposed concentrically with respect to one another. The outer diameter surface portion is rotatably connected to a body of the engine, and the inner diameter surface portion is rotatably connected to an inner stubshaft of the engine, so as to provide a stacked configuration of the inner stubshaft, the outer stubshaft, and the body along a radial direction orthogonal to a longitudinal axis of the engine.

20 Claims, 3 Drawing Sheets

(51) Int. Cl.
*F02C 7/06* (2006.01)
*F02C 7/36* (2006.01)
*F02C 3/107* (2006.01)
*F01D 5/02* (2006.01)
*F01D 25/18* (2006.01)
*F01D 25/24* (2006.01)
*F16C 19/26* (2006.01)
*F16C 33/66* (2006.01)

(52) U.S. Cl.
CPC .............. *F01D 25/24* (2013.01); *F02C 3/107* (2013.01); *F02C 7/06* (2013.01); *F02C 7/36* (2013.01); *F16C 19/55* (2013.01); *F05D 2220/32* (2013.01); *F05D 2230/60* (2013.01); *F05D 2240/54* (2013.01); *F05D 2240/63* (2013.01); *F05D 2260/98* (2013.01); *F16C 19/26* (2013.01); *F16C 33/6659* (2013.01); *F16C 33/6677* (2013.01); *F16C 2360/23* (2013.01)

(56) References Cited

U.S. PATENT DOCUMENTS

| | | | |
|---|---|---|---|
| 3,756,672 A * | 9/1973 | Hibner | F01D 25/164 |
| | | | 384/99 |
| 3,903,690 A | 9/1975 | Jones | |
| 4,500,143 A | 2/1985 | Kervistin et al. | |
| 4,502,274 A | 3/1985 | Girault | |
| 4,781,077 A | 11/1988 | Ei-Sahfei | |
| 6,695,478 B2 * | 2/2004 | Bos | F01D 25/164 |
| | | | 384/99 |
| 7,435,052 B2 | 10/2008 | Spencer et al. | |
| 7,574,854 B2 | 8/2009 | Moniz | |
| 8,100,646 B2 | 1/2012 | Venter | |
| 2008/0075590 A1 | 3/2008 | Moniz et al. | |
| 2014/0126992 A1 | 5/2014 | Morreale et al. | |
| 2016/0032769 A1 * | 2/2016 | Stutz | F01D 25/18 |
| | | | 464/7 |
| 2016/0195019 A1 * | 7/2016 | Roberge | F01D 25/162 |
| | | | 60/39.15 |

\* cited by examiner

RADIALLY STACKED INTERSHAFT BEARING

CROSS-REFERENCE TO RELATED APPLICATIONS

This application claims priority to U.S. Provisional Patent Application No. 62/083,503 filed Nov. 24, 2014, the contents of which are hereby incorporated in their entirety.

FIELD OF TECHNOLOGY

The present disclosure relates to gas turbine engines, and more particularly, but not exclusively, to an intershaft bearing having an outer stubshaft configured to support concentric inner and outer roller bearing elements in the same axial plane, thus reducing the length and corresponding weight of the gas turbine engine, which in turn decreases fuel consumption and internal stresses therein.

BACKGROUND

Gas turbine engine manufacturers continuously investigate engine structure that improves fuel efficiency and service life of the engine, thus requiring fewer repairs of the same. Exemplary gas turbine engines can have an HP-IP bearing chamber, which includes a high pressure shaft ("HP shaft") and an intermediate pressure shaft ("IP shaft"), and each one of the HP and IP shafts can have its own bearing grounded to a stationary structure. Additionally, these bearings may be configured to rotate in respective axial planes spaced apart from one another along a longitudinal axis of the engine. For this reason, the bearing chamber may have a somewhat longer overall body structure and a corresponding larger mass, which can thus increase fuel consumption and mechanical stresses in the engine.

It would therefore be helpful to provide an intershaft bearing, which is configured to improve fuel efficiency of the engine and reduce mechanical stresses therein.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated or schematic in nature to better illustrate and explain an innovative aspect of an example. Furthermore, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

A non-limiting example of a gas turbine engine having a radially stacked intershaft bearing assembly ("assembly") is described herein and is shown in the attached drawings. The assembly includes a radially stacked bearing including two or more concentric rolling interfaces configured to rotatably connect two or more shafts and a stationary body structure to one another. The concentric rolling interfaces include outer and inner roller bearing elements that are configured to rotate within the same axial plane, which is orthogonal to the longitudinal axis of the engine. This configuration can prevent the rolling interfaces from being spaced apart from one another along the longitudinal axis, thus providing a somewhat compact size and reduced weight, which can in turn decrease fuel consumption and mechanical stresses in the engine. In other examples, the assembly can be configured to rotatably connect other suitable components of the engine to one another. Moreover, still other examples of the assembly can be configured to rotatably connect components of any suitable system, such as those that are not within the field of gas turbine engine technology.

Another exemplary illustration includes a process or method for using the intershaft bearing assembly to rotatably connect a plurality of shafts and an engine body to one another. The method includes rotatably connecting an outer diameter surface portion of an outer stubshaft to the body. The method further includes rotatably connecting an inner diameter surface portion of the outer stubshaft to an inner stubshaft. The outer and inner diameter surface portions may be disposed concentrically with respect to one another, so as to provide a stacked configuration of the inner stubshaft, the outer stubshaft, and the body along a radial direction that is orthogonal to a longitudinal axis of the engine. Rotatably connecting the inner stubshaft, the outer stubshaft and the stationary body within one axial plane orthogonal to the longitudinal axis can reduce the length of the engine, thus decreasing its weight and corresponding fuel consumption and internal stresses.

Figure 1:
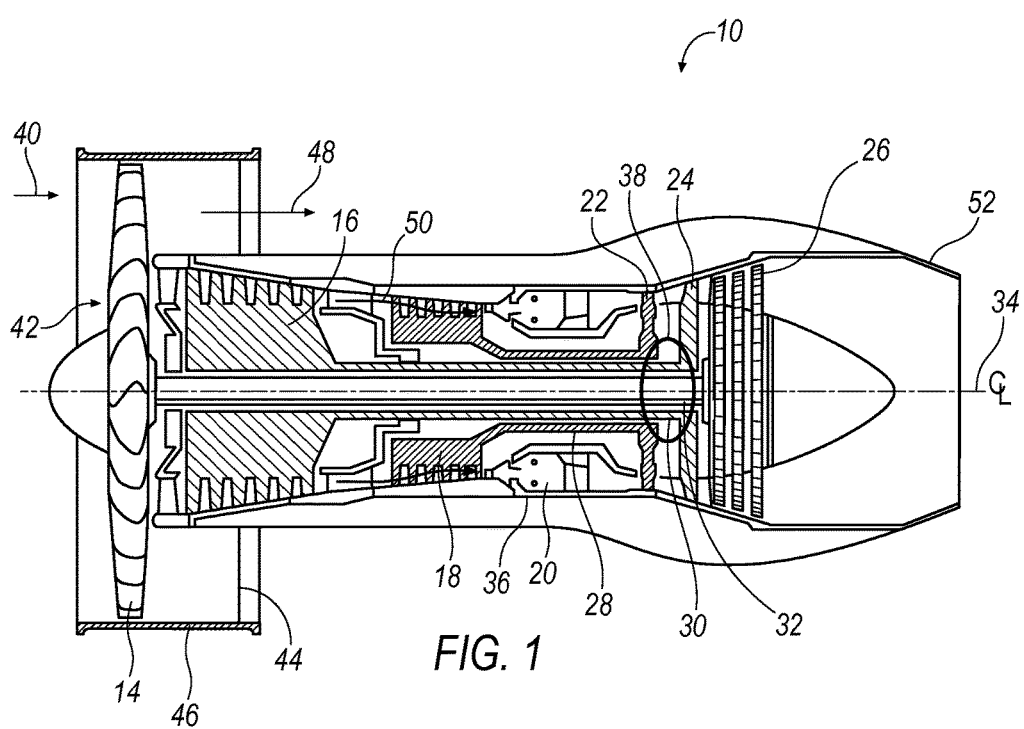
FIG. 1 schematically illustrates some aspects of one non-limiting example of a gas turbine engine including a radially stacked intershaft bearing assembly that has an intershaft bearing configured to reduce the length of the engine and corresponding mechanical stresses, in accordance with one non-limiting exemplary embodiment of the present disclosure.

FIG. 1 illustrates a gas turbine engine 10, which includes a low pressure compressor 14 ("LP compressor"), an intermediate pressure compressor 16 ("IP compressor"), a high pressure compressor 18 ("HP compressor"), a combustor 20, a high pressure turbine 22 ("HP turbine"), an intermediate pressure turbine 24 ("IP turbine") and low pressure turbine 26 ("LP turbine"). The HP compressor 18, the IP compressor 16 and the LP compressor 14 are connected to a respective one of an HP shaft 28, an IP shaft 30 and an LP shaft 32, which in turn are connected to a respective one of the HP turbine 22, the IP turbine 24 and the LP turbine 26. The shafts extend axially and are parallel to a longitudinal center line axis 34. Additionally, two or more of these shafts and an outer body structure 36 ("body") are rotatably connected to one another by an intershaft bearing assembly 38. While FIG. 1 illustrates a three shaft engine, it will be appreciated that other embodiments can have configurations including more or less than three shafts. In general operation of the engine 10, ambient air 40 enters the LP compressor 14 and is directed across a fan rotor 42 in an annular duct 44, which in part is circumscribed by fan case 46. The bypass airflow 48 provides a fraction of engine thrust while the primary gas stream 50 is directed to the combustor 20 and the turbines 22, 24, 26 and then exhausted through a nozzle 52 generating thrust.

Figure 2:
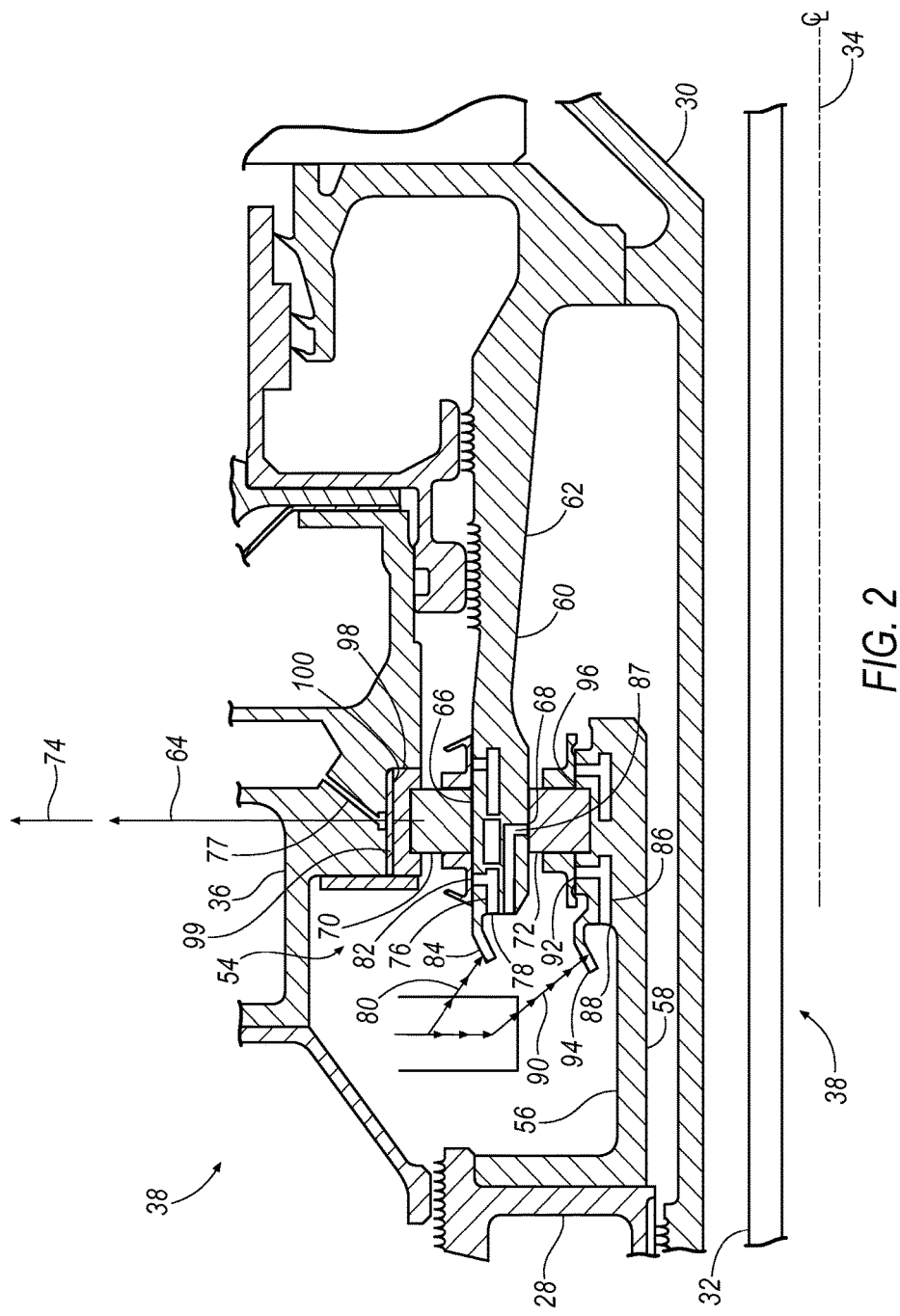
FIG. 2 is an enlarged cross-sectional view of a portion of the radially stacked intershaft bearing assembly of FIG. 1.

Turning now to FIG. 2, there is illustrated an enlarged cross-sectional view of one non-limiting example of the radially stacked intershaft bearing assembly 38 ("assembly") of FIG. 1. This assembly 38 includes the body 36, a radially stacked bearing 54 and an inner stubshaft 56, which are configured to be rotatably connected to one another. In this example, the assembly is configured to rotatably connect the IP shaft, the HP shaft and the body. More specifically, the inner stubshaft 56 is an HP bearing stubshaft 58 attached to the HP shaft 28 that corresponds with an HP rotor, such as the HP compressor 18 or HP turbine 22 (FIG. 1), for supporting the same in the engine 10. Similarly, the bearing 54 is an outer stubshaft 60, namely an IP bearing stubshaft 62, attached to the IP shaft 30 corresponding with an IP rotor, such as the IP compressor 16 or the IP turbine 24 (FIG. 1), for supporting the same in the engine 10. The IP rotor is fluidly connected with the HP rotor. However, in other non-limiting examples, the HP bearing stubshaft 58 and the IP bearing stubshaft 62 may be integral portions of the HP shaft 28 and the IP shaft 30, respectively. In addition, other exemplary assemblies may have inner and outer stubshafts, which correspond with other suitable rotors, such as an LP rotor.

In the present example, the intershaft bearing 54 has a stacked configuration, including the inner stubshaft 56, the outer stubshaft 60 and the body 36 disposed along a radial direction 64, which is orthogonal to the longitudinal axis 34 of the engine 10. The outer stubshaft 60 has outer and inner diameter surface portions 66, 68 that are disposed concentrically with respect to one another. The outer stubshaft 60 is rotatably connected to each one of the body 36 and the inner stubshaft 56, such that the outer diameter surface portion 66 is rotatably connected to the body 36, and the inner diameter surface portion 68 is rotatably connected to the inner stubshaft 56. More specifically, the outer diameter surface portion 66 is configured to support a plurality of outer roller bearing elements 70, and the inner diameter surface portion 68 is configured to support a plurality of inner roller bearing elements 72. The outer and inner roller bearing elements 70, 72 are configured to rotate in the same axial plane 74 orthogonal to the longitudinal axis 34. Thus, the inner roller bearing element 72 is configured to rotatably connect the inner stubshaft 56 and the inner diameter surface portion 68 of the outer stubshaft 60 to one another, and the outer bearing element 70 is configured to rotatably connect the body 36 and the outer diameter surface portion 66 of the outer stubshaft 60 to one another.

The assembly 38 is generally configured to rotate the inner and outer stubshafts 56, 58 in either direction with respect to one another and at various suitable speeds relative to one another. In particular, the inner stubshaft 56 can be configured to rotate at a first rotational speed, and the outer stubshaft 60 may be configured to rotate at a second rotational speed that is greater or less than the first rotational speed. Furthermore, the inner and outer stubshafts 56, 60 may be configured to rotate selectively in a common direction or opposite directions with respect to one another.

The outer stubshaft 60 can be configured to lubricate the outer roller bearing element 70. In particular, the outer stubshaft 60 includes an oil capture flange 84 disposed at a non-parallel position relative to the longitudinal axis 34. This flange 84 is configured to deliver a lubricant 80 toward an inlet 78 of a passage 76 defined by the outer stubshaft 60, in response to centrifugal forces when the outer stubshaft 60 rotates about the longitudinal axis 34. The inlet 78 is configured to receive the lubricant 80, and the passage 76 further includes an outlet 82 fluidly communicating with the inlet 78 and configured to deliver the lubricant 80 to the outer diameter surface portion 66 of the outer stubshaft 60, thus delivering lubricant to the outer roller bearing element 70. Moreover, the body 36 can include a passage 77, which is configured to deliver lubricant to an inside diameter surface portion of the body, thus lubricating an opposing side of the outer roller bearing element 70.

Similarly, the inner stubshaft 56 can be configured to lubricate the inner roller bearing element 72. As one example, the inner stubshaft 56 may include an oil capture flange 94 disposed at a non-parallel position relative to the longitudinal axis 34. This flange 94 may be configured to deliver a lubricant 90 toward an inlet 88 of a passage 86 formed in the inner stubshaft 56, in response to centrifugal forces when the inner stubshaft 56 rotates about the longitudinal axis 34. The inlet 88 is configured to receive the lubricant 90, and the passage 86 further includes an outlet 92 fluidly communicating with the inlet 88 and configured to deliver the lubricant 90 to an outside diameter surface portion 96 formed in the inner stubshaft 56, thus delivering the lubricant 90 to the inner roller bearing element 72. Furthermore, the outer stubshaft 60 can include another passage 87, which is configured to deliver lubricant to its inner diameter surface portion 68, thus lubricating an opposing side of the inner roller bearing element 72.

Also, in this exemplary embodiment, the assembly 38 further includes a bearing outer ring 98 and a damper 99, which are disposed between the outer roller bearing element 70 and the body 36. The damper 99 can reduce vibration transferred between the outer stubshaft 60 and the body 36. In particular, the damper 99 can be attached to an inside diameter surface portion 100 of the body 36, and the bearing outer ring 98 may in turn be disposed between the damper 99 and the outer roller bearing element 70 carried on the outer stubshaft 60. Another damper (not shown) may be used in combination with the inner roller bearing element 72. Examples of dampers may include squeeze film fluid dampers or mechanical dampers. However, other non-limiting examples of the assembly may have various other types of dampers, and these dampers may be connected to other portions of the assembly.

Figure 3:
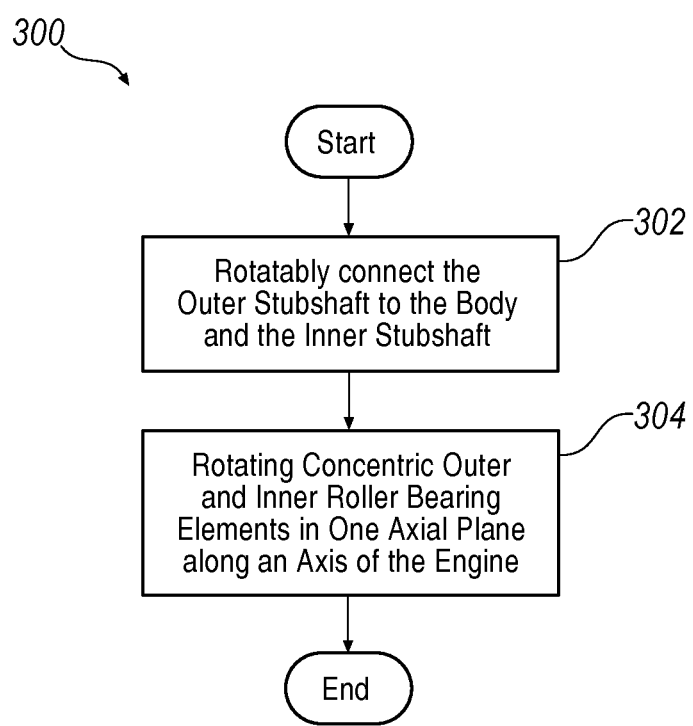
FIG. 3 is a flow chart for a process of operating the assembly of FIG. 2.

Referring now to FIG. 3, there is shown a flow chart of a process or method 300 for rotatably supporting the shafts 56, 58 on the body 36 of the engine 10 of FIG. 1. At step 302, the body 36 is held in one fixed position. Additionally, the outer diameter surface portion 66 of the outer stubshaft 60 is rotatably connected to the body 36, and the inner diameter surface portion 68 of the outer stubshaft 60 is rotatably connected to the inner stubshaft 56. Moreover, the outer and inner diameter surface portions 66, 68 are disposed concentrically with respect to one another, so as to provide a stacked configuration including the inner stubshaft 56, the outer stubshaft 60, and the body 36 disposed along the radial direction 64 orthogonal to the longitudinal axis 34 of the engine 10.

At step 304, the outer roller bearing element 70 is supported on the outer diameter surface portion 66, and the inner roller bearing element 72 is supported on the inner diameter surface portion 68. The outer and inner roller bearing elements 70, 72 are rotated in one axial plane 74 orthogonal to the longitudinal axis 34 of the engine 10. However, the outer and inner roller bearing elements 70, 72 may be supported on bearing raceways attached to or integrally formed within a respective one of the outer and inner diameter surface portions 66, 68. Thus, the intershaft bearing rotatably connects two or more shafts and a body to one another without spacing apart the outer and inner roller bearing elements 70, 72 from each other, which can increase the length and weight of the engine, thus increasing fuel consumption and internal engine stresses.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed as new and desired to be protected by Letters Patent of the United States is:

1. An intershaft bearing for a gas turbine engine, comprising:
    an outer stubshaft including outer and inner diameter surface portions disposed concentrically with respect to one another;
    wherein the outer diameter surface portion is rotatably connected to a body of the gas turbine engine and the inner diameter surface portion is rotatably connected to an inner stubshaft of the gas turbine engine, so as to provide a stacked configuration of the inner stubshaft, the outer stubshaft, and the body of the gas turbine engine along a radial direction that is orthogonal to a longitudinal axis of the gas turbine engine; and
    wherein the outer stubshaft includes first and second passages in respective fluid communication with the outer and inner diameter surface portions.

2. The intershaft bearing of claim 1, wherein the outer diameter surface portion is configured to support an outer roller bearing element, and the inner diameter surface portion is configured to support an inner roller bearing element, and the outer and inner roller bearing elements are configured to rotate in the same axial plane about the longitudinal axis of the gas turbine engine.

3. The intershaft bearing of claim 1, wherein the inner stubshaft is a high pressure bearing stubshaft attached to a high pressure shaft.

4. The intershaft bearing of claim 1, wherein the outer stubshaft is an intermediate pressure bearing stubshaft attached to an intermediate pressure shaft.

5. The intershaft bearing of claim 1, wherein the first and second passages are configured to respectively deliver lubricant to the outer and inner diameter surface portions of the outer stubshaft.

6. An intershaft bearing assembly for a gas turbine engine, comprising:
    a body of the gas turbine engine;
    an inner stubshaft;
    an outer stubshaft having outer and inner diameter surface portions disposed concentrically with respect to one another, such that the surface portions are disposed in one axial plane along a longitudinal axis of the gas turbine engine;
    wherein the outer diameter surface portion is rotatably connected to the body of the gas turbine engine and the inner diameter surface portion is rotatably connected to an inner stubshaft of the gas turbine engine, so as to provide a stacked configuration of the inner stubshaft, the outer stubshaft, and the body along a radial direction that is orthogonal to a longitudinal axis of the gas turbine engine; and
    wherein the outer stubshaft includes first and second passages in respective fluid communication with the outer and inner diameter surface portions.

7. The intershaft bearing assembly of claim 6, further comprising:
    an inner roller bearing element configured to rotatably carry the inner stubshaft and the inner diameter surface portion of the outer stubshaft relative to one another; and
    an outer bearing element configured to rotatably carry the body of the gas turbine engine and the outer diameter surface portion of the outer stubshaft relative to one another;
    wherein the outer and inner roller bearing elements are configured to rotate in the same axial plane about the longitudinal axis of the gas turbine engine.

8. The intershaft bearing assembly of claim 7, further comprising a damper attached to an inside diameter surface portion of the body of the gas turbine engine, and the outer bearing element is disposed between the damper and the outer stubshaft that is in the stacked configuration with the inner stub shaft along the radial direction.

9. The intershaft bearing assembly of claim 6, wherein the inner stubshaft is configured to rotate at a first rotational speed, and the outer stubshaft is configured to rotate at a second rotational speed that is greater than or less than the first rotational speed.

10. The intershaft bearing assembly of claim 6, wherein the inner stubshaft is configured to rotate in a first rotational direction, and the outer stubshaft is configured to rotate in a second rotational direction that is opposite to the first rotational direction.

11. The intershaft bearing assembly of claim 6, wherein the inner stubshaft and the outer stubshaft are configured to rotate in a common rotational direction.

12. The intershaft bearing assembly of claim 6, wherein the first passage includes an inlet configured to receive a lubricant, and the first passage further includes an outlet orthogonal to the inlet, the outlet fluidly communicating with the inlet and configured to deliver the lubricant to the outer diameter surface portion of the outer stubshaft.

13. The intershaft bearing assembly of claim 12, wherein the outer stubshaft includes a flange disposed at an angled position extending radially inward relative to the longitudinal axis and configured to deliver the lubricant toward the inlet of the first passage in response to the outer stub shaft rotating about the longitudinal axis.

14. The intershaft bearing assembly of claim 6, wherein the inner stubshaft defines a third passage including an inlet configured to receive a lubricant, and the third passage further includes an outlet fluidly communicating with the inlet and configured to deliver the lubricant to an outside diameter surface portion of the inner stubshaft.

15. The intershaft bearing assembly of claim 14, wherein the inner stubshaft includes a flange disposed at an angled position extending radially inward relative to the longitudinal axis and configured to deliver the lubricant toward the inlet of the third passage in response to the inner stub shaft rotating about the longitudinal axis.

16. The intershaft bearing assembly of claim 6, wherein the body of the gas turbine engine is disposed in one fixed position.

17. The intershaft bearing assembly of claim 6, wherein the inner stubshaft is a high pressure bearing stubshaft attached to a high pressure shaft that corresponds with a high pressure rotor, and the outer stubshaft is an intermediate pressure bearing stubshaft attached to an intermediate pressure shaft that corresponds with an intermediate pressure rotor fluidly communicating with the high pressure rotor.

18. A process for using an intershaft bearing assembly to rotatably support a plurality of shafts on a body of a gas turbine engine, the process comprising:
   rotatably connecting an outer diameter surface portion of an outer stubshaft to the body of the gas turbine engine;
   rotatably connecting an inner diameter surface portion of the outer stubshaft to an inner stubshaft;
   disposing the outer and inner diameter surface portions concentrically with respect to one another, so as to provide a stacked configuration of the inner stubshaft, the outer stubshaft, and the body along a radial direction that is orthogonal to a longitudinal axis of the gas turbine engine; and
   wherein the outer stubshaft includes first and second passages in respective fluid communication with the outer and inner diameter surface portions.

19. The process of claim 18, further comprising:
   supporting an outer roller bearing element on the outer diameter surface portion;
   supporting an inner roller bearing element on the inner diameter surface portion;
   rotating the outer and inner roller bearing elements in one axial plane about the longitudinal axis of the gas turbine engine.

20. The process of claim 18, further holding the body of the gas turbine engine in one fixed position.

* * * * *